United States Patent Office 3,386,306
Patented June 4, 1968

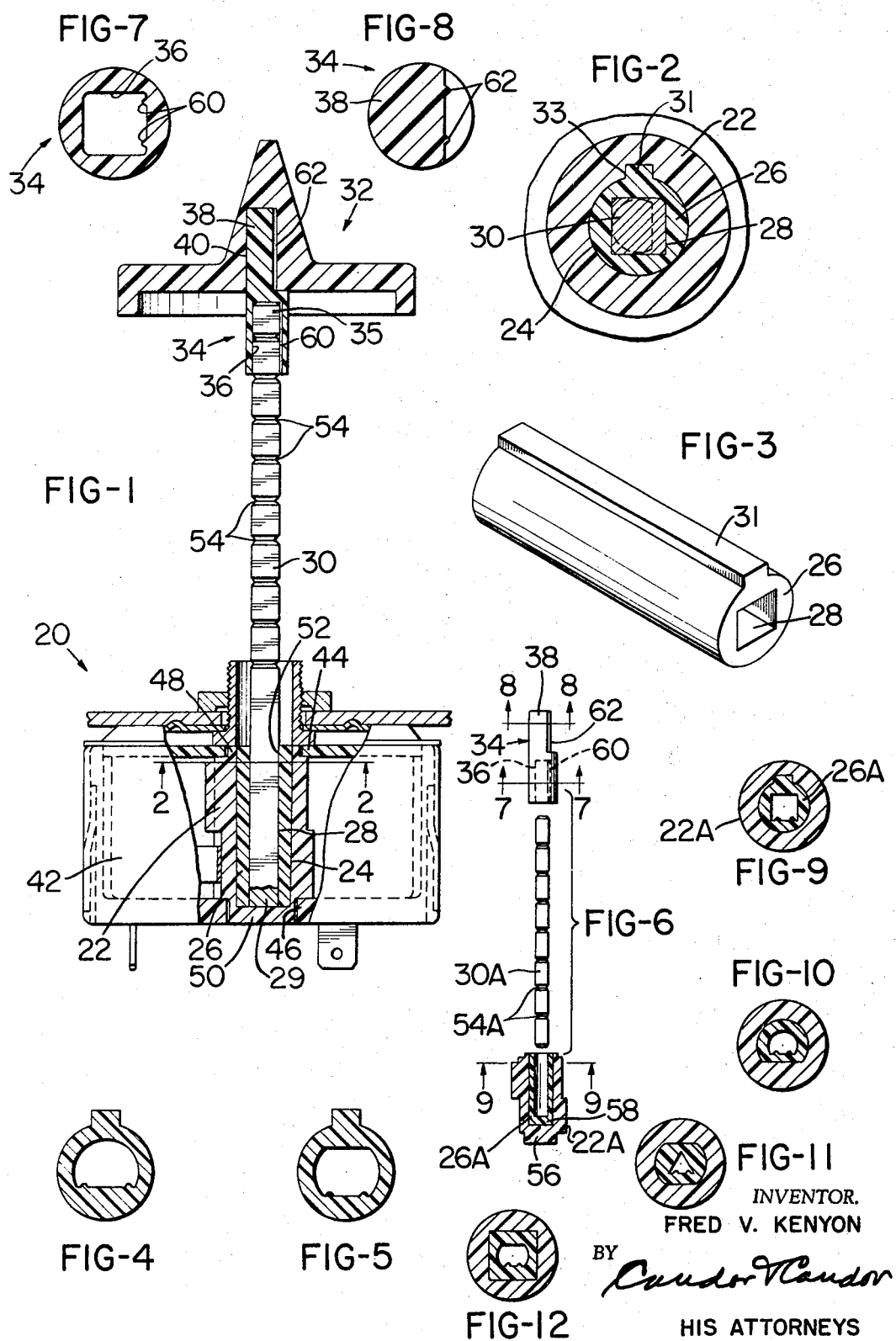

3,386,306
SWITCH WITH CAM HAVING A PLASTIC
SLEEVE INSERT
Fred V. Kenyon, Anaheim, Calif., assignor to Robertshaw Controls Company, Richmond, Va., a corporation of Delaware
Continuation-in-part of application Ser. No. 525,049, Feb. 4, 1966. This application May 31, 1967, Ser. No. 642,473
13 Claims. (Cl. 74—548)

ABSTRACT OF THE DISCLOSURE

A switch construction has an actuating cam made of rigid thermosetting plastic material, with a sleeve insert of relatively yielding thermoplastic material. The sleeve receives an actuating shaft. A knob is secured to the other end of the shaft. A connector, of similar thermoplastic, has a shaft receiving opening at one end receiving such other end of the shaft, and has a knob engaging extension telescoped in an opening in such knob. The shaft may have a series of fracture grooves to sever parts of the shaft to tailor a shaft of desired length.

---

This application is a continuation-in-part of application Serial No. 525,049, filed February 4, 1966, for Switch Construction and Method.

This invention relates to a switch with a cam having a plastic sleeve insert.

One of the features of this invention includes a switch construction having an actuating, relatively unyielding, switch actuating cam, such as a cam made of relatively rigid, thermosetting, plastic material, such as phenolic material, with a sleeve in the cam made of relatively yielding thermoplastic material, such as nylon, or other relatively yielding plastic material. The plastic sleeve is secured in the cam and has a shaft receiving tubular sleeve opening. A cam actuating shaft has one end telescoped, pressed into and snugly held in such sleeve opening.

Another feature of this invention includes a manipulator or knob secured to the other end of the shaft.

Another feature of this invention includes a plastic connector having an opening at one end receiving and snugly holding such other end of the shaft and the other connector end having a manipulator engaging extension telescoped into and snugly held in a connector receiving opening in the knob.

The construction is such that the actuating shaft may be made from longitudinally uniformly transversely cross-sectioned bar stock, and is yet snugly held at both ends respectively by the cam construction and knob construction.

Other features of this invention are apparent from this description, the appended claimed subject matter, and/or the accompanying drawings in which:

FIGURE 1 is a diagrammatic cross section of a switch construction according to this invention.

FIGURE 2 is an enlarged cross section along the line 2—2 of FIGURE 1.

FIGURE 3 is a perspective view of the sleeve shown in FIGURES 1 and 2.

FIGURE 4 is a cross section of a modified form of plastic sleeve having a D-shaped opening.

FIGURE 5 is a view similar to FIGURE 4, and showing another embodiment of a plastic sleeve, having an oblong opening.

FIGURE 6 is an exploded longitudinal view of another embodiment of this invention.

FIGURE 7 is an enlarged cross section along the line 7—7 of FIGURE 6.

FIGURE 8 is an enlarged cross section along the line 8—8 of FIGURE 6.

FIGURE 9 is an enlarged cross section along the line 9—9 of FIGURE 6.

FIGURES 10, 11 and 12 are figures similar to FIGURE 9 but showing further embodiments, having various shaft receiving openings.

Certain words are used in this specification and the appended claimed subject matter which indicate direction, relative position and the like. These words are used for the sake of clearness and brevity. However, it is to be understood that these words are used only in connection with the views of this application, and that in actual use, the parts so described may have entirely different direction, relative position and the like. Examples of such words are "vertical," "horizontal," "upper," "lower," etc.

A switch construction 20, according to this invention, may have an actuating cam 22 made of relatively rigid, thermosetting, plastic material, such as phenolic material. The cam 22 has a sleeve receiving opening 24 to receive a sleeve 26 made of relatively yielding thermoplastic material, such as nylon, or other relatively yielding plastic material. The sleeve 26 is press fitted into opening 24 and has a shaft receiving sleeve opening 28 inside the cam opening 24. A cam actuating shaft 30 has one end 29 telescoped in the sleeve opening 28.

The sleeve 22 has a torque transmitting rib 31 which telescopes in a corresponding groove 33 in the cam 22.

A manipulator or knob 32 may be secured to the other end 35 of the shaft 30. For example, a plastic connector 34 may be provided to connect the shaft to the knob. The connector 34 may be likewise made of a relatively yielding thermoplastic material, such as nylon.

The connector 34 may have a shaft receiving opening 36 at one end of the connector to receive and snugly hold the other or outer end 35 of the shaft 30. The connector 34 also may have a knob or manipulator engaging extension 38 telescoped into and snugly held in a connector receiving opening 40 in the manipulator 32.

The switch construction 20 may include a switch casing 42 which has aligned cam receiving casing bearings 44 and 46. These casing bearings receive cam bearings 48 and 50, respectively. Details of the switch in the casing 42 may be of any well known construction, except for the plastic sleeve addition 26, 26A, etc., of this invention.

For example, such switch construction may be similar to a switch manufactured and sold for several years by the Robertshaw Controls Company, and which has been known as an "infinite control." Such control has a cam having an outer surface substantially as shown herein, but has been made entirely of relatively rigid thermosetting phenolic plastic material with a relatively unyielding shaft opening incapable of yieldingly receiving and snugly holding a shaft such as herein shown at 30 and 30A.

The plastic sleeve 26 has a shaft receiving end opening 52 in the upper cam end bearing 48.

The tubular shaft receiving sleeve opening 28 may be longitudinally uniformly cross-sectioned throughout its length to receive and snugly hold the lower end of the cam actuating shaft 30. The shaft 30 may be inserted in opening 28 by a suitable press fit.

The opening 28 may be cross-sectioned to receive snugly the cross section of the shaft 30. For example, in the embodiment of FIGURES 1–3, the shaft 30 and sleeve opening 28 may have a square cross section. Other shafts and other corresponding sleeves may have D, triangular, and oblong cross sections as variously illustrated in FIGURES 2–5, and 9–12.

Means may be provided to arrest the longitudinal inserting movement of the shaft 30 into the sleeve 26. For example, in FIGURE 1, this may include the lower cam bearing 50 of the casing, which may have a sufficiently small hole, not shown, or may be solid, as illustrated in FIGURE 1, to receive and arrest the downward movement of the shaft 30.

The shaft 30 may be of a longitudinally uniform maximum transverse cross-section for a major portion of its length. However, if desired, a series of fracture grooves 54 may be provided along the length of the shaft 30 so that a portion of the shaft 30 may be broken off to meet the particular requirements of an installation.

In view of this construction, the shaft 30 may be made from longitudinally uniform transverse cross section bar stock.

In the embodiment of FIGURE 6, the thermosetting plastic cam 22A has a solid bottom wall 56 which extends completely across inside the casing bearing 46. The thermoplastic sleeve 26A also has a thermoplastic bottom wall 58, which is integral with the sleeve 26A. The shaft 30A may be substantially the same as shaft 30, except that the lower end of the shaft 30A has the fracture grooves 54A extending sufficiently down along the shaft 30A, so that one or more of such grooves 54A may enter the sleeve 26A.

The connector 34 of FIGURE 6 may be substantially identical with the connector 34 of FIGURE 1. The lower end of the connector 34 may have friction increasing ribs 60 in the opening 36 of the connector. Likewise the extension 38 may be provided with friction increasing ribs 62. The purpose of ribs 60 and 62 is to increase the longitudinal friction between the end of shaft 30 or 30A and the connector 34 and to increase the frictional engagement between the manipulator or knob 32 and the connector 34.

An advantage of this construction is that the shaft 30, or 30A, and any other differently cross-sectioned shafts, may all be made of uniform maximum major cross sections, such as from uniform bar stock, without the necessity of providing flanges and the like in the shaft construction. In view of this, shafts for various installations may be provided by breaking off the desired length of shaft 30 or 30A from bar stock, or a plurality of shafts of predetermined lengths may be used, all of them having the same uniform cross section, but requiring no flanges to limit the downward movement of the shaft and to eliminate the necessity of fastening the shaft inside of the cam in any manner other than by sliding into the press fit of the plastic sleeve 26.

In view of this, the sleeve 28 is made, so that it has a tight press fit within the opening 24 of the cam 22. Likewise, the shafts 30, 30A, and the like are made, so that they have a substantial longitudinal press in fit, so that the shafts will not be readily removed from the switch construction after installation. The connector construction 34 enables the use of previous knobs on a range in replacement construction, since various connectors may be provided to adapt the shaft construction to be secured in the previous knob construction that may be on a range to be repaired as to the switch construction.

The switch construction may be made by assembling the switch casing 42 with the cam 22, but without any plastic sleeve in the cam 22. Any of the various sleeves 26, 26A, etc., may then be pressed into the previously assembled cam of the switch construction. Alternatively, any of the sleeves 26, 26A, etc., may be assembled in the cams 22 before such cams are assembled in the switch construction.

The construction is such that service kits may be provided for service men which include a plurality of variously cross sectioned shaft pieces, a plurality of variously cross sectioned adapters, a plurality of variously internally cross sectioned plastic sleeves, and a plurality of replacement switches with or without inserted sleeves. These cross sections are selected to match the cross sections of the known ranges expected to be serviced in a neighborhood zone, and the like.

With such a kit the service man can select the right switch 20, sleeve 26, 26A, etc., shaft 30, 30A, connector 32, etc., to meet the various requirements to make the required repair.

Also a supplier can tailor large quantities of switches to meet the requirement of range manufacturers, without having to maintain a large inventory of different switches. The switches may be efficiently tailored in any desired quantities, without excessive inventories of completed switches.

A new and useful switch construction has thus been provided.

What is claimed is:

1. In combination, a switch construction having an actuating, relatively unyielding, switch actuating cam having a sleeve receiving cam opening, a relatively yielding sleeve secured in said cam opening and having a tubular shaft receiving sleeve opening inside said cam opening, and a cam actuating shaft having one end telescoped in said sleeve opening.

2. A combination according to claim 1, having a manipulator secured to the other end of said shaft.

3. A combination according to claim 2 having a plastic connector having a shaft receiving opening at one connector end receiving said other end of said shaft, said connector having a manipulator engaging extension telescoped in a connector receiving opening in said manipulator.

4. A combination according to claim 1 in which said switch construction includes a switch casing having aligned cam receiving casing bearings, said cam having a relatively rigid outer body and having cam end bearings respectively in said casing bearings, said sleeve having said shaft receiving sleeve opening in one of said cam end bearings.

5. A combination according to claim 4 in which said sleeve has a longitudinally uniformly cross-sectioned tubular shaft receiving sleeve opening.

6. A combination according to claim 5, and means to arrest longitudinal inserting movement of said shaft.

7. A combination according to claim 6 in which said means to arrest include a bottom wall integral with said sleeve.

8. A combination according to claim 5 in which said cam actuating shaft has a longitudinally uniformly extending maximum transverse cross section for a major portion of its length.

9. A combination according to claim 8 in which said shaft has a series of fracture grooves along its length.

10. A combination according to claim 9 in which said shaft is made from longitudinally uniformly transverse cross sectioned bar stock.

11. A combination according to claim 8 in which a manipulator is secured to the other end of said shaft.

12. A combination according to claim 11 having a plastic connector having a shaft receiving opening at one connector end receiving said other end of said shaft, said connector having a manipulator engaging extension telescoped in a connector receiving opening in said manipulator.

13. A combination according to claim 1 in which said cam is made of relatively rigid plastic material and said sleeve is made of relatively yielding plastic material.

No references cited.

FRED C. MATTERN, Jr., *Primary Examiner.*

F. D. SHOEMAKER, *Assistant Examiner.*